United States Patent
Severinghaus

(10) Patent No.: US 6,969,920 B1
(45) Date of Patent: Nov. 29, 2005

(54) LOW CURRENT SHAPE MEMORY ALLOY DEVICES

(75) Inventor: Edwin Mark Severinghaus, Oakland, CA (US)

(73) Assignee: Mondo-tronics, San Rafael, CA (US)

( * ) Notice: Subject to any disclaimer, the term of this patent is extended or adjusted under 35 U.S.C. 154(b) by 55 days.

(21) Appl. No.: 10/459,647

(22) Filed: Jun. 9, 2003

Related U.S. Application Data

(60) Provisional application No. 60/387,245, filed on Jun. 7, 2002.

(51) Int. Cl.[7] ............ H02P 9/04; F01B 29/10; F02G 1/04
(52) U.S. Cl. ............ 290/1 R; 60/527; 60/528
(58) Field of Search ............ 60/528, 527, 226.3, 60/529; 337/123, 140, 139, 14; 148/402; 219/528; 318/568.11; 901/11; 307/109, 110, 307/140; 606/32, 53; 290/1 R

(56) References Cited

U.S. PATENT DOCUMENTS

| | | | | |
|---|---|---|---|---|
| 4,079,294 A | * | 3/1978 | Teuling | 315/411 |
| 4,664,493 A | * | 5/1987 | Takagi | 396/452 |
| 5,061,914 A | * | 10/1991 | Busch et al. | 337/140 |
| 5,211,371 A | * | 5/1993 | Coffee | 251/11 |
| 5,642,033 A | * | 6/1997 | Bartol et al. | 322/25 |
| 5,714,863 A | * | 2/1998 | Hwang et al. | 320/166 |
| 5,774,319 A | * | 6/1998 | Carter et al. | 361/93.4 |
| 5,816,306 A | * | 10/1998 | Giacomel | 160/6 |
| 6,528,782 B1 | * | 3/2003 | Zhang et al. | 250/226 |
| 6,543,224 B1 | * | 4/2003 | Barooah | 60/527 |
| 6,574,958 B1 | * | 6/2003 | MacGregor | 60/527 |
| 6,723,072 B2 | * | 4/2004 | Flaherty et al. | 604/131 |
| 2002/0194702 A1 | * | 12/2002 | Hinkley et al. | 16/260 |

OTHER PUBLICATIONS

Mondo-Tronics Solar Space Wings Kit—Instructions V1.0 P.5. Section 5—How It Works: Schematic=Theory of Operation Published Apr. 2002 MondoTronics Author Ed Severinghaus.

* cited by examiner

*Primary Examiner*—Darren Schuberg
*Assistant Examiner*—Julio C. Gonzalez Ramirez
(74) *Attorney, Agent, or Firm*—Robert W. J. Usher

(57) ABSTRACT

An SMA device in which an SMA wire actuating element is operated periodically at a low voltage by power derived from a current source current which is too low to heat the wire directly sufficiently for effective actuation. The low current source is connected to a capacitor which discharges periodically through the SMA wire actuating element in response to an upper threshold charge stored by the capacitor thereby to periodically supply the SMA wire actuating element with a current level sufficiently high for effective operation. The discharge is effected through a signal amplifier formed by first and second transistors coupled to provide positive feedback and connected to a switch formed by a third transistor biased by output from the second transistor to periodically conduct, thereby permitting discharge of the capacitor through the SMA actuating element.

6 Claims, 1 Drawing Sheet

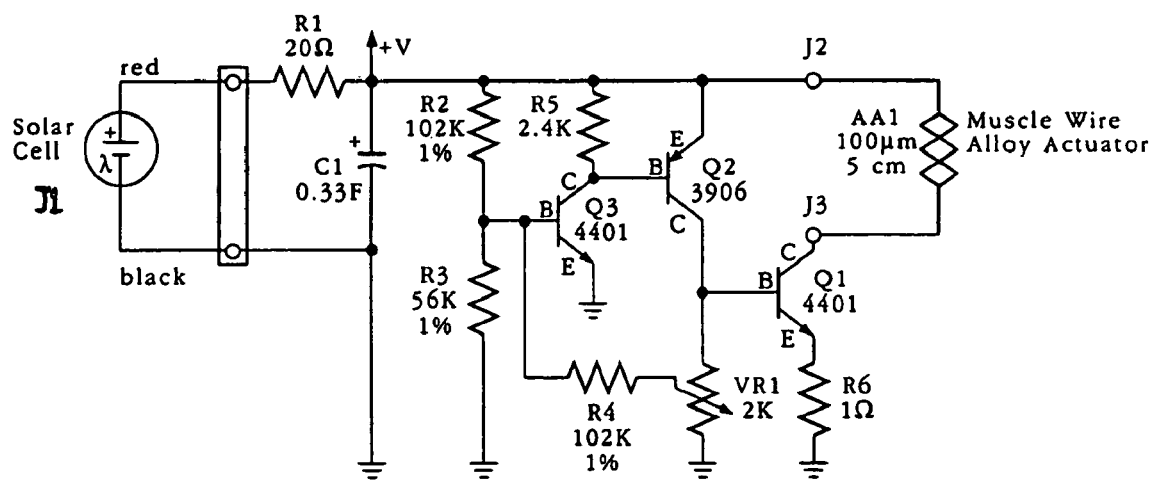

LOW CURRENT SHAPE MEMORY ALLOY DEVICES

RELATED APPLICATION

Priority is claimed from my provisional patent application No. 60/387,245, filed Jun. 7, 2002, the disclosure of which is incorporated herein by reference.

FIELD OF THE INVENTION

The invention relates to shape memory alloy (SMA) devices, in particular, Nitinol SMA actuating elements which change shape by the application of heat to produce a muscle effect.

BACKGROUND OF THE INVENTION

Devices incorporating Nitinol actuating elements, (specifically Flexinol 100 HT manufactured by Dynalloy of Irvine, Calif.), which contract when heated by an adequate electric current to provide a repeatable muscle effect producing motion such as periodic wing flapping in model insects or limb movement in other robotic creatures, have been known and used for many years. Various embodiments of SMA actuating elements (known as Muscle Wires, which is a registered trademark of Mondo-tronics Inc of San Rafael, Calif.), are described in the RobotStore catalogue, published 1998 by Mondo-tronics. Inc of San Rafael Calif.

However, for some potential applications, such as when power is supplied by a small photoelectric (solar) cell or with a set of rectified low current Christmas tree lighting decorations, (involving single bulb replacement by an SMA device), the level of current supplied continuously by the source is too low to heat the element sufficiently for effective operation by direct connection. In addition, conventional charge storage devices such as high capacity low resistance capacitors are rated for operation only in low voltage applications.

SUMMARY OF THE INVENTION

It is one object of the invention to provide an SMA device wherein an SMA actuating element, such as a wire, ribbon, or film is operated periodically by power derived from a low current power source which is too low to heat the element directly.

According to one aspect of the invention, the source current is fed to a capacitor and means are provided to discharge the capacitor periodically through the SMA actuating element in response to an amount of charge stored by the capacitor, thereby to periodically supply the SMA actuating element with a current level sufficiently high for effective operation.

Preferably, the discharge means comprises signal amplification means operating switching means operable to discharge the capacitor through the SMA actuating element.

The amplification means may comprise first and second transistors coupled to provide a current amplifier with a positive feedback and the switching means may comprise a third transistor operated by output from the second transistor to periodically conduct to permit current of the capacitor discharge to flow through the SMA actuating element.

BRIEF DESCRIPTION OF THE DRAWINGS

In order that the invention may be readily understood, a specific embodiment thereof will now be described, by way of example only and with reference to the accompanying drawing which is a circuit diagram of the device

DESCRIPTION OF PARTICULAR EMBODIMENT

At initial power up, the first, second and third transistors Q3, Q2, and Q1, respectively, are off. Light striking solar cell J1 creates a current which in turn creates an increasing voltage across a capacitor C1 of high capacity (0.33 F) which, as a result, starts to charge, and at the base of Q3, but in smaller proportion, according to the relative values of resistors R2, R3, R4 and potentiometer VR1. First and second transistors Q3 and Q2, respectively, form the core of a reflexive oscillation circuit.

When the base (B) of transistor Q3 receives about 1 microamp (uA) of current, transistor Q3 begins to turn on, then so does transistor Q2.

As the collector of Q2 begins to conduct, the voltage on potentiometer VR1 begins to increase. Resistor R4 feeds this voltage change back as increased drive current to the base of transistor Q3 (a positive feedback loop) so that transistor Q2 reaches maximum conduction very quickly. When resistor transistor Q2 supplies about 200 uA, transistor Q1 begins to turn on.

The voltage at the base of transistor Q1 rises to a value of about 1 volt when fully on. Resistor R6 at 1 ohm limits the gain of Q3, limiting the maximum load current. The voltage developed by the load current across R6 also contributes to the positive feedback as limiting the current passing through Q1 and therefore the decline in voltage at the base of Q1 when switched on, thereby permitting Q2 collector voltage to increase more than if R6 were absent, a fraction of which increase is fed back via the resistor network.

When transistor Q1 is on, capacitor C1 discharges through the SMA wire actuating element AA1 causing it to heat and contract, and, for example, lift wings of a model butterfly. Capacitor C1 discharges until the operating voltage is too low to sustain the 'on' condition of transistor Q3. As Q3 turns off, the positive feedback described above causes transistor Q2 to turn off with transistor Q1 following, until all three are fully off.

Thus, a means for monitoring the discharge of the capacitor C1 comprises transistor Q3 together with resistors R1, R2 and R4 and a switching means permitting actuating current to flow through the SMA device comprises transistor Q1.

Resistor R5 and potentiometer VR1 assure that normal tiny leakage currents do not get magnified by the various gain stages into significant drains on the charging circuit. They also create well defined current turn on thresholds for Q2 and Q1, respectively.

The capacitor charging cycle begins again, but now from a middle level voltage, typically 1.4 volts, instead of from 0 volts, and the circuit oscillates stably with a time constant depending also on the load resistance and the charging rate via resistor R1.

The circuit is designed primarily for use with a 3.5 volt (measured with no load) solar cell providing 1 to 15 milliamps (mA) of charging current. Circuit drain is about 15 uA while charging, but requires about 200 uA to trigger.

It is important that the positive feedback effect take over before the increasing drain through the voltage sensing and discharge circuits becomes large enough to 1) significantly slow down the charging of the capacitor, or 2) completely prevent it from charging enough to trip the positive feedback into locking the circuit "ON". In either case, performance is at least degraded substantially or there is complete failure.

A suitable solar cell is part 10 WA manufactured by Film Technologies of Boone, Iowa. The capacitor is part EEC-AOEL334 manufactured by Panasonic of Japan. The conducting portion of the wire of the SMA wire actuator is typically no more than 5 cm long.

Adjustment of the potentiometer VR1 alters the time base so that, if set part way over its range, the positive feedback or hysteresis will be proportionately smaller providing a shorter pulse. If it is set too low, there will not be sufficient positive feedback to cause the transistors Q3 & Q2 circuit to turn on fully.

The value of resistor R5 can be increased for a marginal increase in low lighting condition operation range—but given normal loading, even 1 mA net charging gives only one operation about every 200 seconds or so.

The solar cell provided can supply about 15 mA in direct sunlight. The circuit is not recommended, as wired, for operation from very low current sources (e.g. in low light levels producing under 0.5 mA).

The low source current can be supplied from a solar cell, a chain of holiday lights, or a fuel cell, for example.

The resistor R1, permits operation of the circuit by a voltage source such as a battery.

What is claimed is:

1. A shape memory alloy device in which a shape memory alloy actuating element is operated for a single cycle periodically at a low voltage by power derived from charge accumulated from a source current which is too low to heat the actuating element for effective operation, comprising a capacitor of low resistance and high capacity operably connected to receive a low current source for continuous charging thereby; switching means operably connected between the capacitor and the shape memory alloy device and monitoring means operably connected between the capacitor and the switching means for monitoring discharge of the capacitor by sensing a voltage of the capacitor and operating the switching means to partially discharge the capacitor periodically through the shape memory alloy actuating element, commencing discharge in response to a sensed voltage corresponding to an upper threshold amount of charge stored by the capacitor and ceasing discharge in response to a sensed voltage corresponding to a lower threshold amount of charge remaining in the capacitor thereby to periodically supply the shape memory alloy actuating element with a transient current level sufficiently high for effective operation for a single cycle.

2. A shape memory alloy device according to claim 1 wherein the monitoring means comprises a reflexive oscillation circuit.

3. A shape memory alloy device according to claim 2 wherein the reflexive oscillation circuit comprises a first transistor and a second transistor coupled together to provide signal gain and positive feedback and the switching means comprises a third transistor having a base connected to an output from the second transistor so as to periodically conduct thereby permitting the discharge of the capacitor through the shape memory alloy actuating element.

4. A shape memory alloy device according to claim 3 wherein the voltage sensing means comprises the first transistor.

5. A shape memory alloy device according to claim 1 wherein the capacitor is operably connected to the source of low current by a current limiting resistor.

6. An shape memory alloy device according to claim 1 wherein the low source current is provided by one of a solar cell and fuel cell.

* * * * *